W. S. IRELAND AND W. H. MEYER.
TIGHTENER FOR MOTOR DRIVEN BELTS.
APPLICATION FILED OCT. 16, 1919.
1,413,028. Patented Apr. 18, 1922.
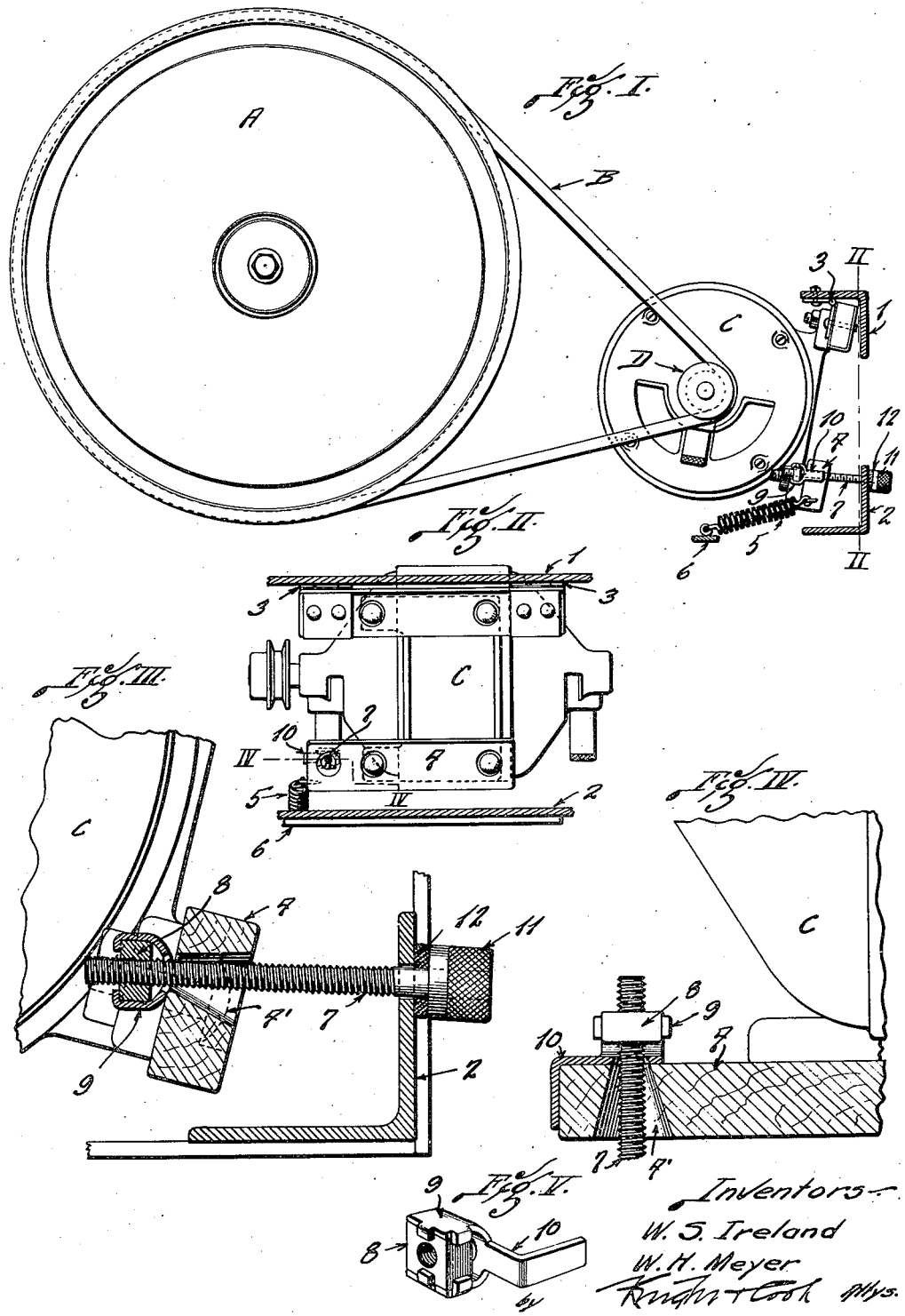

UNITED STATES PATENT OFFICE.

WARD S. IRELAND AND WILLIAM H. MEYER, OF ST. LOUIS, MISSOURI, ASSIGNORS, BY MESNE ASSIGNMENTS, TO THE DAVIS SEWING MACHINE COMPANY, A CORPORATION OF DELAWARE.

TIGHTENER FOR MOTOR-DRIVEN BELTS.

1,413,028.  Specification of Letters Patent.  Patented Apr. 18, 1922.

Application filed October 16, 1919. Serial No. 331,167.

*To all whom it may concern:*

Be it known that we, WARD STONE IRELAND and WILLIAM HENRY MEYER, citizens of the United States, and residents of St. Louis, in the State of Missouri, have invented certain new and useful Improvements in Tighteners for Motor-Driven Belts, of which the following is a full, clear, and exact description, reference being had to the accompanying drawings, forming a part of this specification.

Our invention relates to a tightener whereby power belts operated through the medium of electric or other motors, may be held in a desired condition of tautness, the object of the invention being attained by pivotally mounting the motor and adjusting it relative to its pivotal support to provide for the axis of the motor being adjusted relative to the axis of the pulley driven by a power belt extending from the motor to such pulley.

Fig. I is a side elevation of our belt tightener.

Fig. II is a vertical section taken on line II—II, Fig. I.

Fig. III is an enlarged vertical section taken through the portions of the belt tightener in which the adjusting screw is located, the adjusting screw being shown in elevation.

Fig. IV is an enlarged horizontal section on line IV—IV, Fig. II.

Fig. V is a perspective view of the nut which receives the adjusting screw and the clip by which said nut is held.

In the drawings A designates a pulley of any suitable description adapted to be driven by a power belt B. C designates a motor, by preference an electric motor, having a pulley D from which power is communicated through the belt D to the pulley A.

1 and 2 designate, respectively, upper and lower supports of any preferred form. The upper support serves as a hanger for the motor C which is pivoted thereto preferably by one or more hinges 3. The axis of the pivotal connection of the motor to the upper support extends parallel to the axes of the motor C and the pulley A, thereby providing for the motor being swung toward or away from the pulley A to acquire the desired tautness in the power belt B.

The motor C is provided with an arm 4 located beneath the point of pivotal support of the motor and opposite the support 2 to which devices for adjusting the motor for belt tightening effect are fitted. 5 is a spring connecting the arm 4 to a fixed member 6, said spring being so disposed as to tend to move the motor C toward the axis of the pulley A.

7 designates an adjusting screw mounted in the lower support 2 and extending through an aperture 4′ in the arm 4, larger than the diameter of the screw, so that the arm 4 and adjusting screw may partake of movement relative to each other during any movement of the motor relative to its pivotal support.

The adjusting screw 7 is fitted to a nut 8 located in front of the arm 4 and therefore when said adjustment screw is turned in the proper direction the motor is drawn rearwardly relative to the pulley A with the result of separating the axes of the pulleys A and D more widely from each other and tightening the power belt B.

The nut 8 is held in a fixed position by a holder comprising a clip 9 in the form of a yoke having parallel arms terminating in inturned lips which embrace the nut as seen in Fig. V. Said clip contains an aperture through which the adjusting screw extends, and the rear face of the clip is rounded to permit rocking motion during the pivotal movement of the motor C. An angular tongue 10 extending from the clip 9 rests against the front face of the arm 4 and extends along the end of said arm. This tongue, by bearing against the two faces of the arm 4 at angles to each other, as described, serves to hold the clip 9 from turning and as a consequence no means for fastening the clip to the arm is required. The adjusting screw 7 is provided with a head 11 by which it may be manipulated and a yieldable washer 12 located between such head and the support 2 serves as a cushion between said head and support to avoid rattling.

When it is desired to tighten the power belt D the adjusting screw 7 is rotated in the proper direction and the motor is moved in a direction away from the pulley A with belt tightening action, the spring 5 at such time yielding to permit movement of the motor. The spring 5 at all times tends to move the motor toward the pulley A and therefore acts to hold the motor adjusting means tightly in engagement with the motor to avoid any play which would otherwise exist between the adjusting device and the motor.

We claim:

1. A belt tightener comprising a movably mounted motor having an arm extending therefrom, a nut holding clip fitted to said arm, said clip being provided with an angular tongue engaging the front and end faces of said arm, a nut held by said clip, and an adjusting screw, mounted in a suitable support, engaging said nut and adapted to impart movement to said motor to tighten a belt operated by the motor.

2. The combination with a pulley, of a movably mounted motor, a power belt extending from said motor to said pulley, belt tightening means including an adjustable stop member for limiting the motion of the motor toward the pulley, and a spring tending to move said motor toward said pulley.

3. The combination with a pulley, of a movably mounted motor, a power belt extending from said motor to said pulley, belt tightening means including an adjustable stop member for limiting the motion of the motor toward the pulley, and a spring tending to move said motor toward said pulley, said motor being provided with an extension adapted to engage said adjustable stop member, and said stop member being rigid so as to cooperate with said extension to securely hold the motor in the position to which it is adjusted.

4. The combination of a pulley, a movably mounted motor provided with an extension, a power belt extending from said motor to said pulley, belt tightening means including an adjustable stop member engaging said extension to limit the motion of said motor toward said pulley and an adjusting screw whereby said stop member is rigidly held in the position to which it is adjusted, and a spring tending to move said motor toward said pulley so as to retain said extension in engagement with the rigidly held stop member.

In testimony that we claim the foregoing we hereunto affix our signatures.

WARD S. IRELAND.
WILLIAM H. MEYER.